Figure 1:
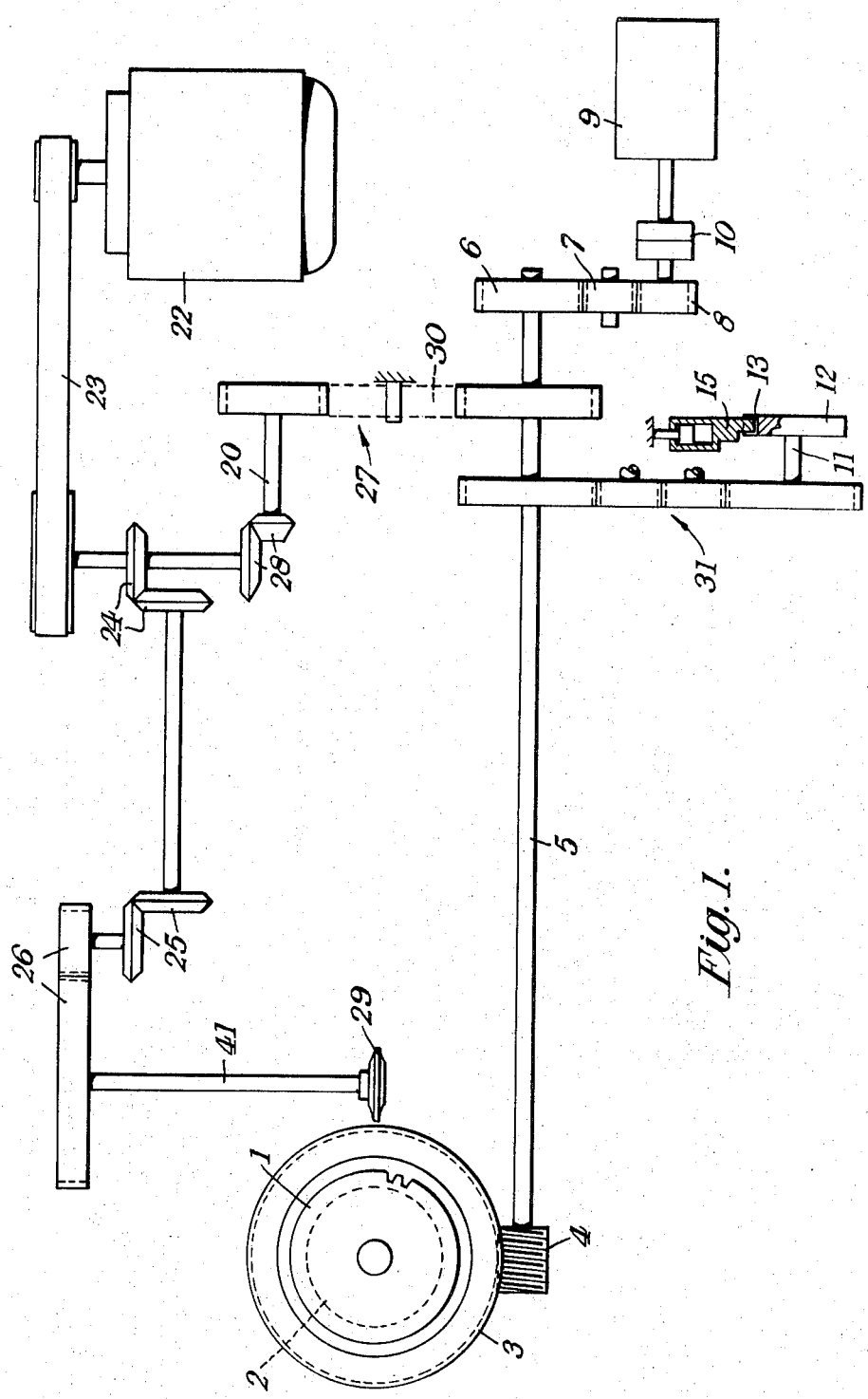

United States Patent [19]
Hodgson

[11] 3,859,893
[45] Jan. 14, 1975

[54] GEAR HOBBING MACHINES

[75] Inventor: Brian Hodgson, Rowlands Gill, England

[73] Assignee: Machine Tool Divisional Services Limited, Coventry, Warwickshire, England

[22] Filed: May 17, 1973

[21] Appl. No.: 361,349

[30] Foreign Application Priority Data
May 17, 1972  Great Britain.................. 23134/72

[52] U.S. Cl............................................. 90/4, 90/9
[51] Int. Cl............................................... B23f 5/20
[58] Field of Search............... 90/4, 9; 318/371, 39; 74/813 IC, 814

[56] References Cited
UNITED STATES PATENTS

| | | | |
|---|---|---|---|
| 575,393 | 1/1897 | Eberhardt et al.......................... | 90/4 |
| 1,364,933 | 1/1921 | Hunziker.................................. | 90/4 |
| 3,232,170 | 2/1966 | Findley..................................... | 90/4 |

Primary Examiner—Andrew R. Juhasz
Assistant Examiner—Z. R. Bilinsky
Attorney, Agent, or Firm—Watson, Cole, Grindle & Watson

[57] ABSTRACT

A gear hobbing machine having a gear train interconnecting a hob and a workpiece to be machined by the hob, the gear train being disconnectable to permit of cutting a stationary workpiece by a milling cutter substituted for the hob, a subsidiary motor operable to impart an increment of indexing rotation to the workpiece between successive cutting operations of the milling cutter, an index plate geared to a table supporting the workpiece and arranged when the milling cutter is in operation to perform a predetermined integral number of revolutions for each indexing movement of the workpiece, a bolt which is engageable with the index plate to lock the table against rotation, and a counter for counting the rotations made by the index plate when the bolt is withdrawn and causing arrest of the index plate and re-engagement of the bolt after the predetermined number of revolutions of the index plate have been performed.

3 Claims, 6 Drawing Figures

GEAR HOBBING MACHINES

In a gear hobbing machine teeth are generated on a workpiece by related rotation of a hob and the workpiece. Gear hobbing machines therefore include a transmission which will provide the related rotation of these two members. The cycle of operation is such that the hob is traversed relative to the workpiece to the position of start of cut when rotation of hob and workpiece commences. The hob is then traversed across the face width of the workpiece and teeth are generated around the whole periphery of the work. When the required length of tooth has been produced on the workpiece the hob is retracted from the workpiece and is traversed back to its start of cycle position. Rotation of the hob and workpiece is stopped after the cutting process is completed. Instances arise, however, for example if a very large volume of metal must be removed to form a tooth space or because of the actual shape of the space, when it is not possible to produce a gear by this continuous generating process. It may then be necessary to mill each tooth space separately using in place of the hob a cutter which is formed to suit the required tooth space, forming the whole required length of one tooth space while the workpiece remains stationary and then rotating the workpiece to a position which allows cutting of the next tooth space. By a succession of cutting and indexing operations any required number of teeth may be cut around the circumference of a workpiece. If such an operation is to be performed on a gear hobbing machine which is provided with a transmission for continuous rotation of the tool and the workpiece, it is necessary to provide means to disconnect the drive to the workpiece while the cutting operation takes place, to hold the workpiece in a fixed position during this operation and then to provide a drive to cause the workpiece to rotate to the position required for the next cutting operation. In the transmission of a hobbing machine certain change speed gears are provided which are readily removable, and which are interchangeable to provide various rotational ratios between tool and workpiece. In providing for the indexing arrangement described above it is a simple matter to disconnect the drive to the workpiece by omitting one or more of the change speed gears. The object of this invention is to provide a mechanism to hold the workpiece fixed during the cutting process and a subsidiary drive to rotate the workpiece to positions for successive cutting operations.

The invention accordingly provides a gear hobbing machine having a gear train interconnecting a hob and a workpiece to be machined by the hob, the gear train being disconnectable to permit of cutting a stationary workpiece by a milling cutter substituted for the hob, a subsidiary motor operable to impart an increment of indexing rotation to the workpiece between successive cutting operations of the milling cutter, an index plate geared to a table supporting the workpiece and arranged when the milling cutter is in operation to perform a predetermined integral number of revolutions for each indexing movement of the workpiece, a bolt which is engageable with the index plate to lock the table against rotation, and a counter for counting the rotations made by the index plate when the bolt is withdrawn and causing arrest of the index plate and reengagement of the bolt after the predetermined number of revolutions of the index plate have been performed.

Preferably a second counter is provided which operates at the end of each indexing operation to count the number of indexing movements made by the workpiece and to terminate machining when all the teeth have been cut on the workpiece.

Preferably also the bolt is arranged to move radially into engagement with a slot in the index plate to lock it against rotation, the bolt and slot being so shaped that engagement of the bolt in the slot takes up backlash in the transmission between the index plate and the table.

Figure 2:
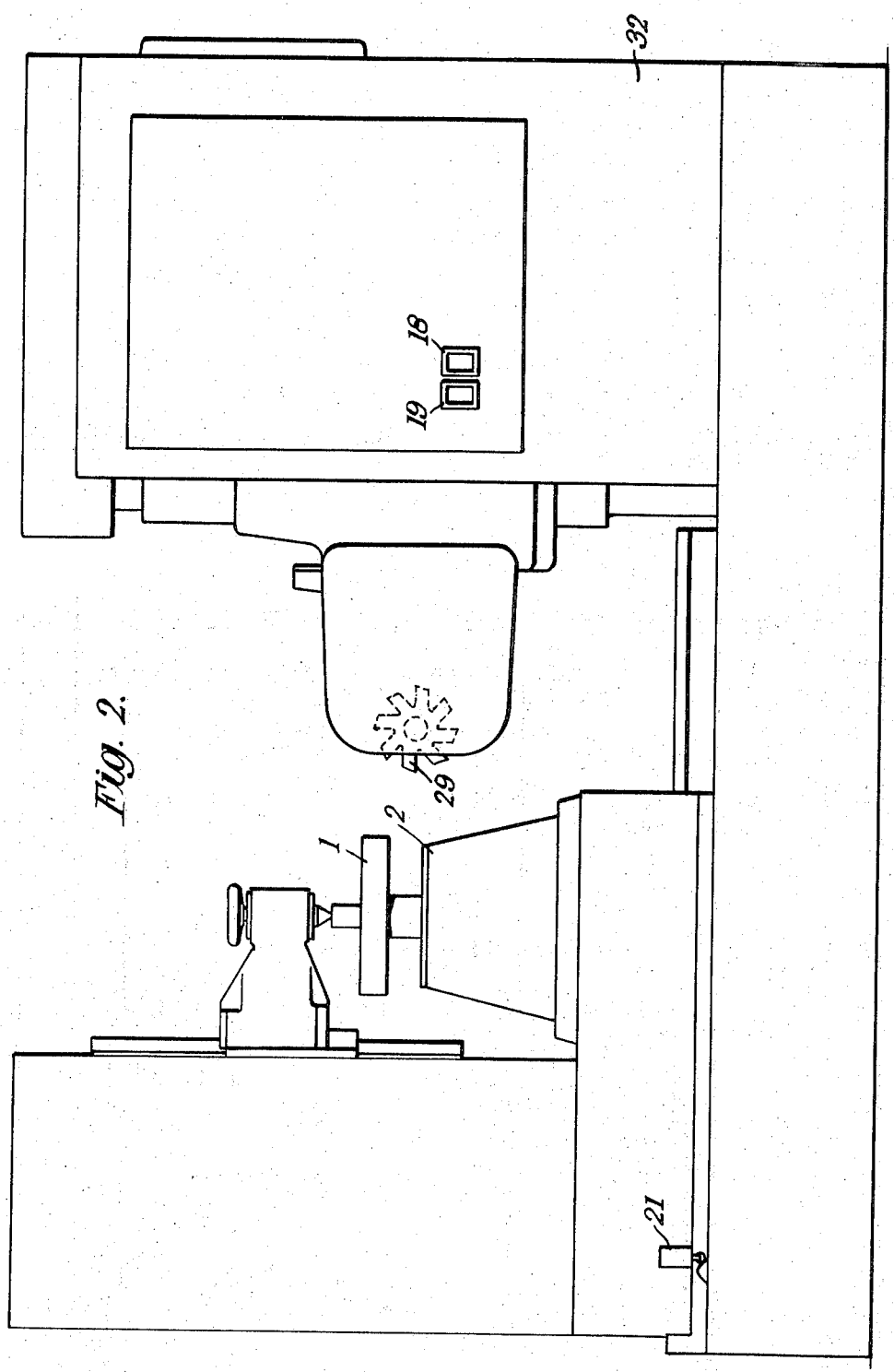
Figure 3:
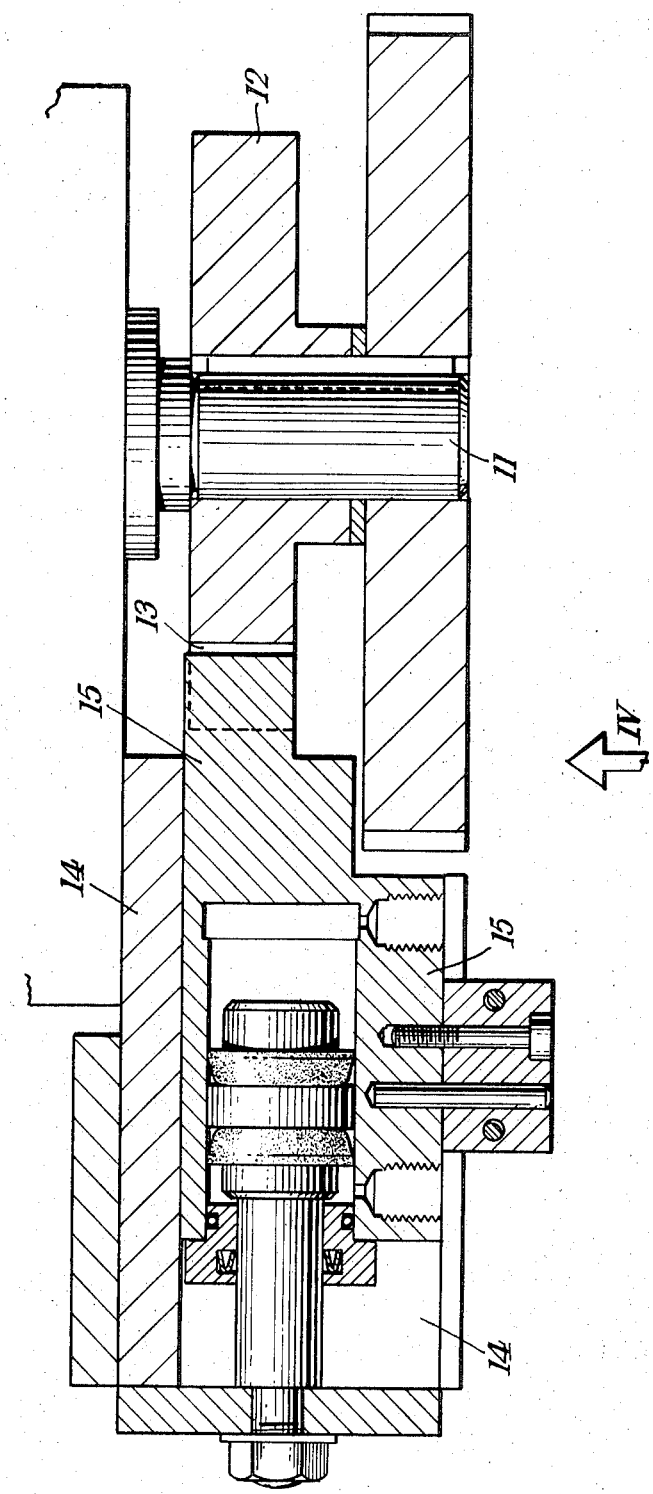
Figure 4:
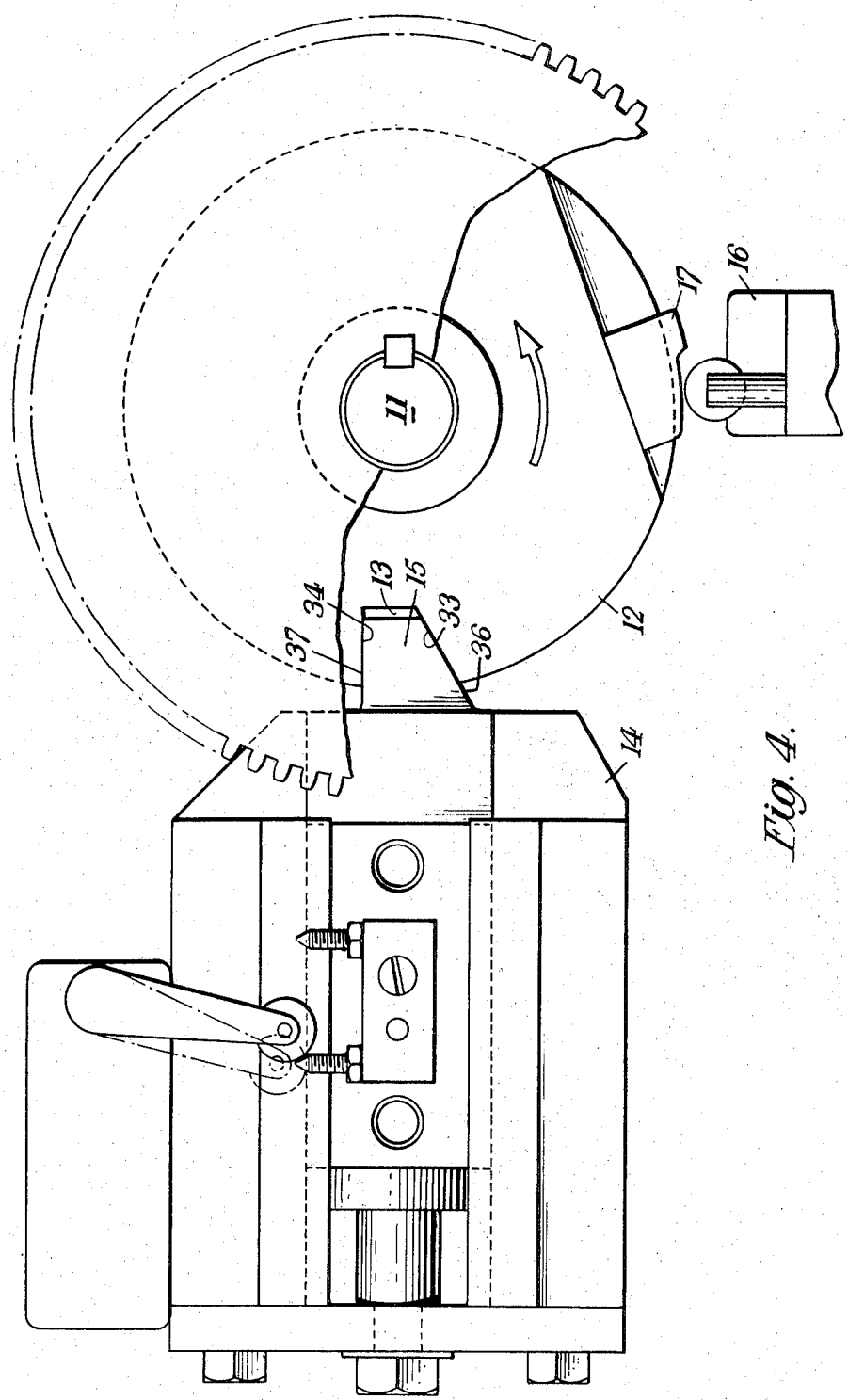
Figure 5:
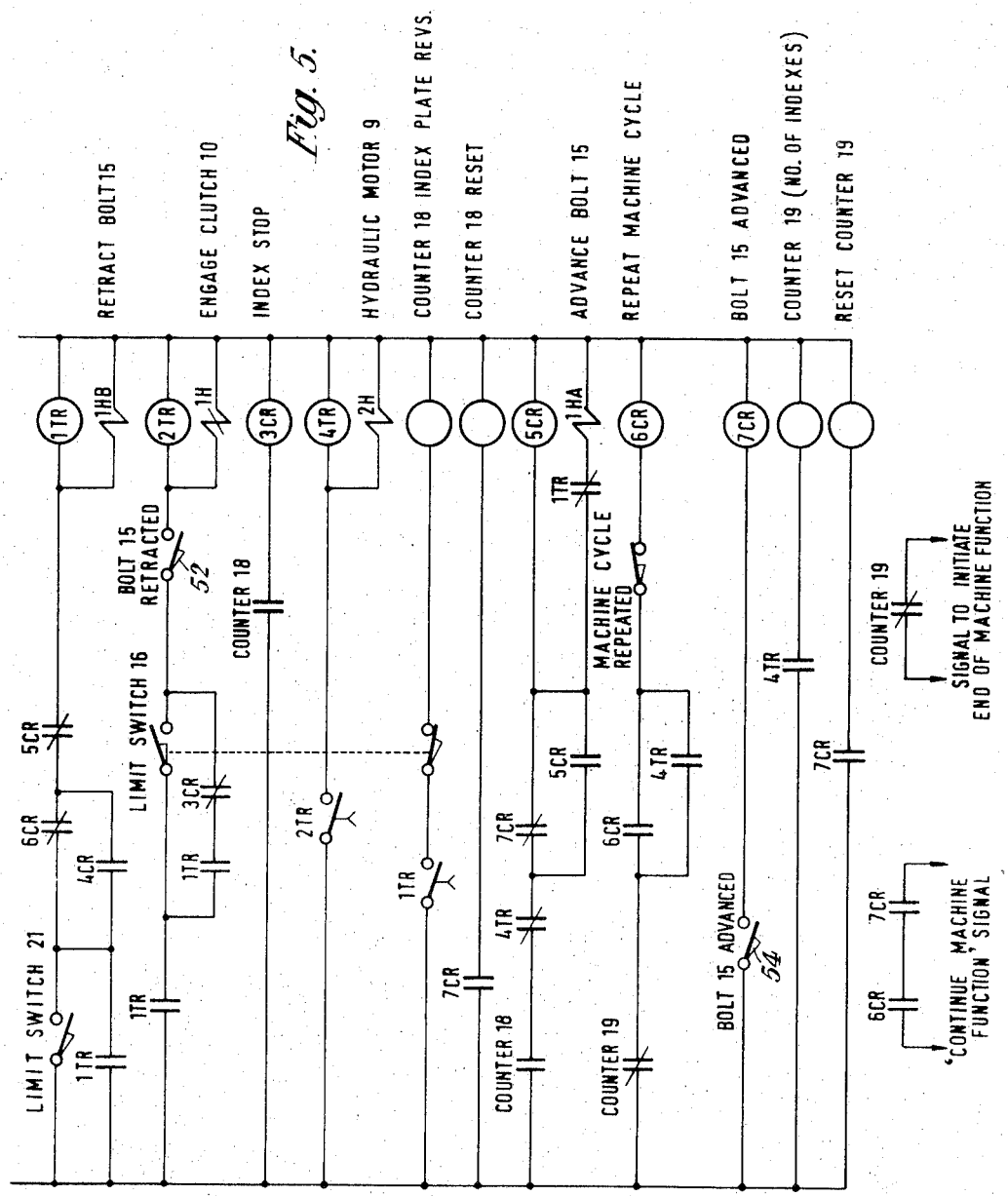
Figure 6:
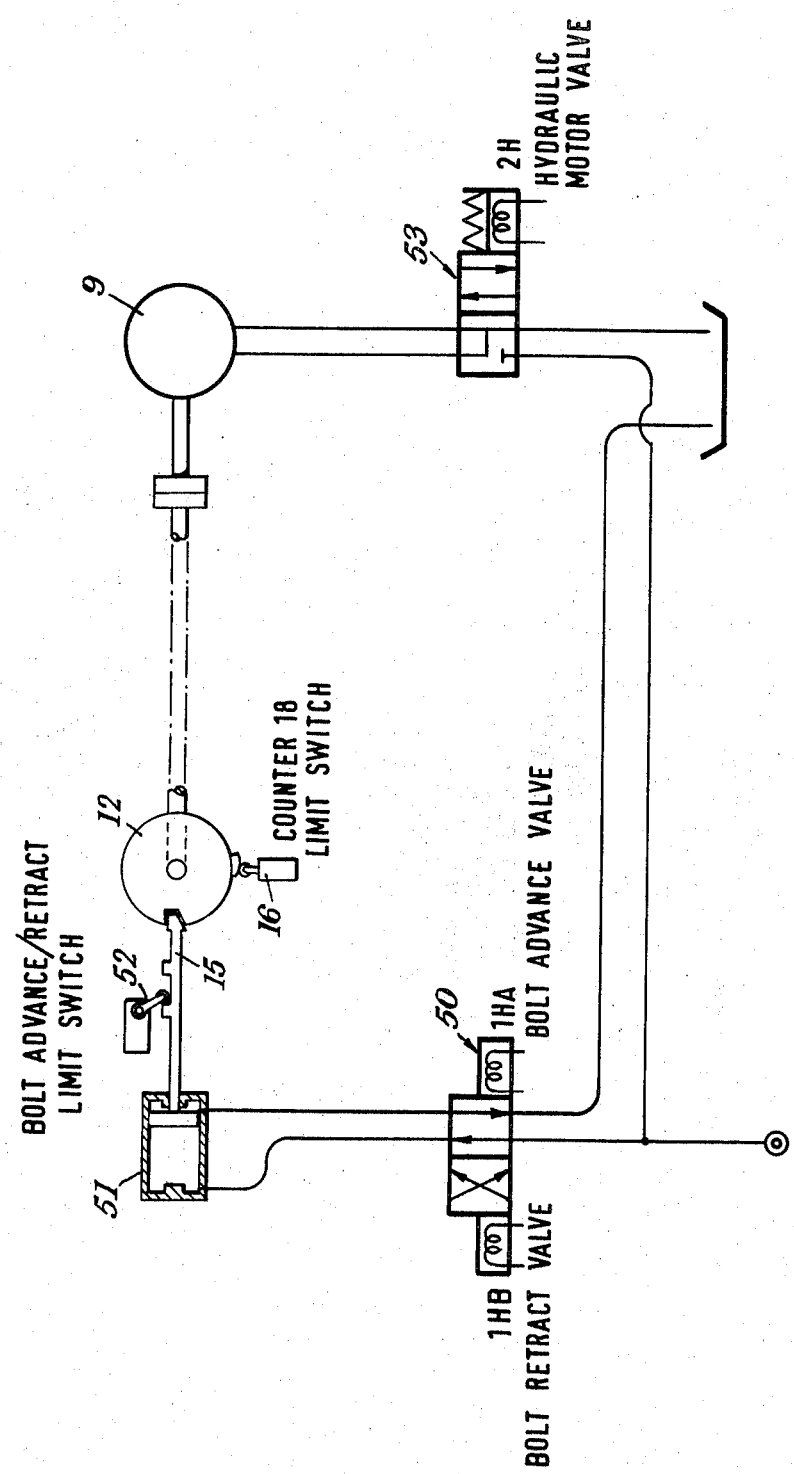

One embodiment of hobbing machine according to the invention, which is also capable of milling a workpiece, will now be described in more detail, by way of example, with reference to the accompanying drawings, in which:

FIG. 1 is a schematic layout of part of the transmission of the machine showing the machine organised for a milling operation, FIG. 2 is a side view of the machine, FIG. 3 is a sectional view showing mechanism for indexing and holding stationary the workpiece for performance of a milling operation, FIG. 4 is a view in the direction of the arrow IV in FIG. 3, FIG. 5 is an electric circuit diagram and FIG. 6 is a hydraulic circuit diagram.

As shown in FIG. 1, the workpiece 1 to be machined is clamped to a worktable 2 carrying on its underside a worm wheel 3 driven by a worm 4 on a shaft 5. During a normal hobbing operation the workpiece 1 coacts with a hob (not shown) on a shaft 41 driven by an electric motor 22 through a belt drive 23, bevel gearing 24, 25 and gears 26. The shaft 5 is driven by change speed gearing 27 from a shaft 20 geared to the hob by bevel gearing 28. Conventional mechanism (not shown) is provided inside the machine frame 32 (FIG. 2) for imparting traverse to the hob and may be driven from the transmission connecting the hob and the workpiece or from an independent source. When the machine is to be changed over to milling with the workpiece stationary, a milling cutter 29 is substituted, as shown, for the hob and the gear 30 in the change speed gear train 27 is removed to disconnect the shaft 5 from the shaft 20. A drive for indexing the workpiece 1 between successive operations is then provided by a hydraulic motor 9, which can drive the shaft 5 when required through a clutch 10 and gears 8, 7, 6.

To control the motion imparted by the motor 9 a further change speed gear train 31 is fitted providing a drive from the shaft 5 to a shaft 11 which carries an index plate 12, having a slot 13 in its periphery (see FIGS. 3 and 4). Rigidly mounted on the machine frame adjacent to the index plate is a bracket 14 carrying a bolt 15. This bolt is movable radially towards the index plate 12, under the action of fluid pressure, and is capable of engaging the slot 13 in the index plate. Engagement of the bolt 15 in the slot 13 prevents any rotation of the index plate 12 and also, because of the gear connections to the shaft 5, the worktable 2 and hence the workpiece 1. The bolt 15 therefore serves to hold the workpiece in a fixed position during a milling operation. When the bolt 15 has been retracted from the slot 13 in the index plate 12 the workpiece may be rotated by means of the hydraulic motor 9 on engagement of the clutch 10. Because of the gear connections between the workpiece 1 and the index plate 12 any rotation of the workpiece will be accompanied by corresponding determinable rotation of the index plate. The change speed gears 31 fitted between the shafts 5 and 11 are such that the index plate 12 performs an integral number of revolutions for each indexing movement of the workpiece 1. The revolutions of the index plate are counted by a microswitch 16 (FIG. 4) adjacent to the index plate which is operated at each revolution of the index plate by a cam plate 17 to send a signal to a subtractive counter 18 (FIG. 2). When the number of signals from the microswitch 16 reaches a value preset on the counter 18 a circuit is completed to allow successive operations to take place. A further subtractive counter 19 counts the number of increments of angular indexing rotation given to the workpiece. This is preset to suit the number of increments which amount to one complete revolution of the workpiece so that when the workpiece has performed one complete revolution the counter 19 will prevent further cutting operations.

The counters 18, 19 are mounted at a remote control station as shown in FIG. 2.

In the following description of the machine cycle it is assumed that it is intended to cut four teeth in the workpiece i.e. the indexing mechanism is required to give four increments of index to complete one revolution of the workpiece. It is further assumed that the worm 4 has one start and the wormwheel 3 has 108 teeth. Thus one revolution of the workpiece corresponds to 108 revolutions of the shaft 5 and for each of the four increments of revolution of the workpiece the shaft 5 will make 27 revolutions. If change speed gears 31 having a ratio of 1:1 are fitted between the shafts 5 and 11, for each increment of index the index plate 12 will make 27 revolutions. The counter 18 is therefore set to the value 27 and the counter 19 to the value 4.

The start of a milling cycle is signalled by a limit switch operated when the bolt 15 has been moved forwardly to engage the slot 13 in the index plate 12 and lock the workpiece against rotation. With the workpiece so held the cutter 29 is traversed by an independent motor through the workpiece to form a single tooth space across the full face width. The cutter is then traversed back to the start of cut position.

The start of an indexing cycle is signalled by the cutter having reached the end of its return traverse and the workpiece having been withdrawn horizontally out of engagement with the cutter. This is signalled by a limit switch 21 on the machine base (FIGS. 2 and 5). Tripping of the limit switch 21 energizes a relay 1TR (FIG. 5), which closes its normally open contacts to energize a solenoid 1HB, so operating a valve 50 (FIG. 6) to admit fluid to a cylinder 51 to effect retraction of the bolt 15. Retraction of the bolt 15 trips a limit switch 52 to energize relays 2TR and 4TR and solenoids 1H and 2H, which respectively effect engagement of the clutch 10 and operation of a valve 53 to supply fluid to the motor 9 to rotate the index plate 12 to index the workpiece.

When the counter 18 has counted 27 signals it responds by generating a signal to energize a relay 3CR, so opening its normally closed contacts and de-energizing the relays 2TR, 4TR and the solenoids 1H and 2H. The clutch 10 is therefore disengaged and the hydraulic motor 9 stops. The signal from the counter also energizes a relay 5CR, which opens normally closed contacts to de-energize the relay 1TR and the solenoid 1HB. Return of a contact of the relay 1TR to its normally closed position energizes a solenoid 1HA to cause the valve 50 to shift to its alternative position to cause the cylinder 51 to advance the bolt 15 to re-engage the slot 13 in the index plate 12.

The microswitch 16 is so positioned that, when the clutch 10 is disengaged and the motion of the index plate ceases due to friction, the slot 13 in the index plate is not directly opposite the bolt 15 but slightly in advance of that position. The slot 13 in the index plate has an inclined face 33 on one side and a radial face 34 on the other and the end of the bolt 15 has an inclined face 36 on one side and a flat face 37 on the other. Thus when the bolt 15 is advanced to mesh with the slot 13 on the index plate it causes the index plate to rotate slightly in the direction opposite to that in which it has previously rotated. This causes the backlash to be taken up through the gear train 31 between the shaft 11 and the shaft 5. During the last revolution of the index plate, the speed of the hydraulic motor 9 is reduced, so that the final stopping position of the index plate relative to the bolt may be very finely controlled.

Advance of the bolt 15 trips a limit switch 54 to energize a relay 7CR to provide a re-setting signal to the counter 18 to the value 27, and also energizing a relay 6CR, which closes a contact to give a signal for the ensuing cutting cycle to commence. The relay 6CR is reset by a limit switch tripped during the cutting cycle.

The above described procedure continues until four indexing operations have been performed. When the last indexing operation, which follows the fourth cutting cycle is about to commence, the counter 19 sends a signal to prevent energisation of the relay 6CR to initiate a further cutting cycle and is reset to the value four.

I claim:

1. A convertible gear hobbing machine having a gear train interconnecting a hob and a table for carrying a workpiece to be machined by the hob, the gear train being selectively disconnectable from said table to permit cutting a stationary workpiece by a milling cutter substituted for the hob, a subsidiary motor operable to impart an increment of indexing rotation to the workpiece table between successive cutting operations of the milling cutter, an index plate geared to the table supporting the workpiece and arranged when the milling cutter is to be used to perform a predetermined integral number of revolutions for each indexing movement of the workpiece table, a bolt which is engageable with the index plate to lock the table against rotation, a counter for counting the revolutions made by the index plate when the bolt is withdrawn and causing arrest of the index plate and re-engagement of the bolt after the predetermined number of revolutions of the index plate have been performed, and a second counter which operates at the end of each indexing operation to count the number of indexing movements made by the workpiece table and to terminate machining when all the teeth have been cut on the workpiece.

2. A convertible gear hobbing machine having a gear train interconnecting a hob and a table for carrying a workpiece to be machined by the hob, the gear train being selectively disconnectable to permit cutting a stationary workpiece by a milling cutter substituted for the hob, a subsidiary motor operable to impart an increment of indexing rotation to the workpiece table between successive cutting operations of the milling cutter, an index plate geared to the table supporting the workpiece and arranged when the milling cutter is to be used to perform a predetermined integral number of revolutions for each indexing movement of the workpiece table, a bolt which is engageable with the index plate to lock the table against rotation, and means for counting the revolutions made by the index plate when the bolt is withdrawn and causing arrest of the index plate and re-engagement of the bolt after the predetermined number of revolutions of the index plate have been performed, said bolt being arranged to move radially into engagement with a slot in the index plate to lock it against rotation, the bolt and slot being so shaped that engagement of the bolt in the slot takes up backlash in the transmission between the index plate and the table.

3. A convertible gear hobbing machine comprising a table for supporting a workpiece, a hob shaft, a main motor connected to rotate the hob shaft, a gear train interconnecting the hob shaft and the table and operative to impart continuous rotation to the table from the main motor during a hobbing operation on the workpiece on the table by a hob on the hob shaft, said gear train being selectively disconnectable to permit of cutting operations on a stationary workpiece on the table by a milling cutter substituted for the hob, an index plate geared to the table, a bolt which is engageable with the index plate to lock said plate and said table against rotation while said cutting operations are performed, a subsidiary indexing motor connected to impart rotational movement to the index plate, means responsive to termination of a cutting operation for effecting withdrawal of the bolt and starting of said subsidiary motor to rotate the index plate, a counter for counting the revolutions made by the index plate which is settable to count to a predetermined count and means controlled by the counter and operative when the counter attains said predetermined count to stop said subsidiary motor and reengage said bolt with said index plate.

* * * * *